(12) United States Patent
Ma et al.

(10) Patent No.: US 9,121,586 B2
(45) Date of Patent: Sep. 1, 2015

(54) LIGHTING EFFECT DEVICE AND ELECTRIC DEVICE

(75) Inventors: Baobao Ma, Beijing (CN); Xiaoli Fan, Beijing (CN); Lei Ma, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 367 days.

(21) Appl. No.: 13/807,470

(22) PCT Filed: Jun. 29, 2011

(86) PCT No.: PCT/CN2011/076579
§ 371 (c)(1),
(2), (4) Date: Dec. 28, 2012

(87) PCT Pub. No.: WO2012/000437
PCT Pub. Date: Jan. 5, 2012

(65) Prior Publication Data
US 2013/0099675 A1   Apr. 25, 2013

(30) Foreign Application Priority Data

Jun. 30, 2010 (CN) .......................... 2010 1 0223577
Jun. 30, 2010 (CN) .......................... 2010 2 0254273

(51) Int. Cl.
*H05B 37/02* (2006.01)
*H05B 39/04* (2006.01)
(Continued)

(52) U.S. Cl.
CPC ............... *F21V 13/08* (2013.01); *F21S 8/032* (2013.01); *F21V 23/0464* (2013.01); *F21V 33/0052* (2013.01); *G02B 6/0001* (2013.01); *G02B 6/0061* (2013.01); *G02B 6/0068* (2013.01);*G02B 6/0091* (2013.01); *G06F 3/0428* (2013.01); *G10H 3/146* (2013.01); *H05B 33/00* (2013.01); *F21Y 2101/025* (2013.01)

(58) Field of Classification Search
USPC .................................................. 315/149–159
See application file for complete search history.

(56) References Cited

U.S. PATENT DOCUMENTS 8,767,790 B2 * 7/2014 Sipes, Jr. ..................... 372/50.12
2008/0031293 A1 * 2/2008 Takamizawa et al. .......... 372/33
(Continued)

FOREIGN PATENT DOCUMENTS

CN    101566899        10/2009
CN    101587403  A    11/2009
(Continued)

OTHER PUBLICATIONS

PCT/CN2011/076579 International Preliminary Report on Patentability dated Jan. 8, 2013 (6 pages).
(Continued)

*Primary Examiner* — Brandon S Cole
(74) *Attorney, Agent, or Firm* — Brinks Gilson & Lione; G. Peter Nichols

(57) ABSTRACT

A lighting effect device is provided, which is used for equipment with an operation surface that has a reflective characteristic. The lighting effect device includes at least a light supply unit for forming a light layer above the operation surface. The light layer is not crossed with the operation surface, where at least part of light of the light layer forms a visible lighting effect around an operator after reflected by the operator entering the light layer. The device requires less light sources and no position detection, so that the device is inexpensive and reliable. At the same time, a dodging layer and/or a reflective layer improve lighting effect and provide user a better experience.

19 Claims, 4 Drawing Sheets

(51) Int. Cl.

| | |
|---|---|
| *H05B 41/36* | (2006.01) |
| *F21V 13/08* | (2006.01) |
| *G06F 3/042* | (2006.01) |
| *F21V 23/04* | (2006.01) |
| *F21V 33/00* | (2006.01) |
| *F21S 8/00* | (2006.01) |
| *F21V 8/00* | (2006.01) |
| *G10H 3/14* | (2006.01) |
| *H05B 33/00* | (2006.01) |
| *F21Y 101/02* | (2006.01) |

(56) References Cited

U.S. PATENT DOCUMENTS

2009/0278795 A1* 11/2009 Hansen et al. ................ 345/156
2011/0221706 A1* 9/2011 McGibney et al. ........... 345/175
2011/0242006 A1* 10/2011 Thompson et al. ........... 345/173
2012/0043915 A1* 2/2012 Rohwedder et al. .......... 315/362
2012/0161647 A1* 6/2012 Fornasiero et al. ........... 315/158

FOREIGN PATENT DOCUMENTS

| | | |
|---|---|---|
| CN | 201465076 U | 5/2010 |
| CN | 201753849 | 3/2011 |
| JP | 2010026966 A | 2/2010 |
| WO | WO2009/135320 | 11/2009 |

OTHER PUBLICATIONS

PCT/CN2011/076579 International Search Report dated Sep. 29, 2011 (3 pages).
Chinese First Office Action with English Translation for related Application No. 2010102235770, dated Jan. 5, 2013, 11 pages.

* cited by examiner

LIGHTING EFFECT DEVICE AND ELECTRIC DEVICE

This application claims priority to International Application No. PCT/CN2011/076579 filed on Jun. 29, 2011; to Chinese Patent Appln. 201020254273.6 filed on Jun. 30, 2010, and also to Chinese Patent Appln. No. 201010223577.0 filed on Jun. 30, 2010, the entire contents of each are incorporated herein by reference.

BACKGROUND OF THE INVENTION

The present invention relates to the field of lighting effect processing technology, in particular to a lighting effect device and an electric device.

In order to enhance experience effect for users, when an object contacts with a part of a surface, the part of the surface contact by the object is caused to have a higher luminance than the other portions.

In order to achieve such effect, in the prior art, it generally needs to detect the position of the contact portion, and then controls the corresponding light-sources below that position to illuminate that portion, so that the above-mentioned effect can be achieved.

However, in the process of implementing embodiments of the present invention, the inventors have found that the prior art has at least disadvantages of high-cost and complexity in realization, with the reasons as follows:

First of all, a plurality of light-sources are required to be applied beneath a region, and the number of the required light-sources is relatively large;

Second, a position-detecting device is required to be provided, to acquire the position of a contact portion, and then the corresponding light-sources can be controlled to illuminate;

Finally, collaboration among the light-sources, the detecting device and the control system is required, which is complex in implementation.

SUMMARY OF THE INVENTION

The object of the present invention is to provide a lighting effect device and an electric device, which are simple and low-cost for implementation, and in which, when a point or an area in a region is touched, the touch portion in the region is controlled to have a higher luminance than the other portions.

In order to achieve the above object, an embodiment of the present invention provides a lighting effect device, used for an apparatus having an operation surface with the operation surface having a reflective characteristic, and the lighting effect device comprises:

at least one light-supplying unit for forming a light-layer above the operation surface, wherein, the light-layer has no intersection with the operation surface, and at least part of the light from the light-layer, after being reflected by an operation body which enters into the light-layer, forms a visible optical-effect around the operation body.

In the above-described lighting effect device, the lighting effect device further comprises:

a light-uniforming unit, formed by substances with non-uniform optical properties and provided on the operation surface;

at least part of the light from the light-layer enters into the light-uniforming unit after being reflected by an operation body which enters into the light-layer, then the light which enters into the light-uniforming unit forms the visible optical-effect in the scattering effect of the light-uniforming unit.

In the above-described lighting effect device, the lighting effect device further comprises:

a light-uniforming unit, formed by substances with non-uniform optical properties and provided on the operation surface;

a reflective layer, provided between the light-uniforming unit and the operation surface;

at least part of the light from the light-layer enters into the light-uniforming unit after being reflected by an operation body which enters into the light-layer, the light which enters into the light-uniforming unit forms the visible optical-effect in the scattering effect of the light-uniforming unit and the reflection effect of the reflective layer.

In the above-described lighting effect device, the lighting effect device further comprises:

a reflective layer, provided on the operation surface;

at least part of the light from the light-layer reaches the reflective layer after being reflected by an operation body which enters into the light-layer, and forms the visible optical-effect in the reflection effect of the reflective layer.

In the above-described lighting effect device, the light-uniforming unit is a light-uniforming plate, an acrylic plate, a light-guiding plate doped with scattering particles, or a flexible film with a light-scattering function.

In the above-described lighting effect device, the light-supplying unit is a parallel light tube.

In the above-described lighting effect device, the light-supplying unit comprises:

a light-source;

a baffle, provided in the light-transmission path of the light-source, wherein, the baffle is provided thereon with a slit parallel to the surface of the light-uniforming unit, the slit is in a higher level than the surface of the light-uniforming unit, and the light which passes through the slit forms the light-layer.

In the above-described lighting effect device, the light-supplying unit further comprises:

an optical module, provided between the light-source and the baffle, and used for converting the light emitted from the light-source into parallel light.

In the above-described lighting effect device, the light-supplying unit comprises:

a laser diode;

a column-shaped prism, provided in the light-transmission path of the laser diode.

In the above-described lighting effect device, there further comprises:

a light-sensor for detecting ambient light-intensity;

a controller, connected with the light-sensor and the laser diode, and used to control the luminous intensity of the laser diode according to the ambient light-intensity detected by the light-sensor.

In order to achieve the above object, an embodiment of the present invention also provides an electric device, comprising:

a housing, having a first hole located in a first surface of the housing;

an operable member having an operation surface, located in the housing, with the operation surface being exposed through the first hole;

at least one light-supplying unit, provided in the housing and used for forming a light-layer above the operation surface, wherein, the light-layer has no intersection with the operation surface, and at least part of the light from the light-layer, after being reflected by an operation body which enters into the light-layer, forms a visible optical-effect around the operation body;

the position of the visible optical-effect corresponds to the position of the operation body relative to the operation surface.

In the above-described electric device, there further comprises:

a light-uniforming unit, formed by substances with non-uniform optical properties and applied on the operation surface;

at least part of the light from the light-layer enters into the light-uniforming unit after being reflected by an operation body which enters into the light-layer, and the light which enters into the light-uniforming unit forms the visible optical-effect in the scattering effect of the light-uniforming unit.

In the above-described electric device, there further comprises:

a light-uniforming unit, formed by substances with non-uniform optical properties and applied on the operation surface;

a reflective layer, provided between the light-uniforming unit and the operation surface;

at least part of the light from the light-layer enters into the light-uniforming unit after being reflected by an operation body which enters into the light-layer, the light which enters into the light-uniforming unit forms the visible optical-effect in the scattering effect of the light-uniforming unit and the reflection effect of the reflective layer.

In the above-described electric device, the light-uniforming unit is a light-uniforming plate, an acrylic plate, a light-guiding plate doped with scattering particles, or a flexible film with a light-scattering function.

In the above-described electric device, there further comprises:

a reflective layer, provided on the operation surface;

at least part of the light from the light-layer reaches the reflective layer after being reflected by an operation body which enters into the light-layer, and forms the visible optical-effect in the reflection effect of the reflective layer.

In the above-described electric device, the light-supplying unit is a parallel light tube.

In the above-described electric device, the electric device further comprises a touch-panel, and the operation surface is a touch-surface of the touch-panel; the touch-panel is embedded on the housing, and after the light-uniforming unit is applied to the touch-surface, the upper surface of the light-uniforming unit is lower than the upper surface of the housing.

The light-supplying unit comprises a light-source, and the light-source is provided in the interior of the housing; the interior of the housing has a light-channel, and the light emitted from the light-source passes through the light-channel and forms the light-layer above the light-uniforming unit.

In the above-described electric device, the light-source is a laser diode, and the light-supplying unit further comprises a column-shaped prism provided in the light-channel.

In the above-described electric device, there further comprises:

a light-sensor for detecting ambient light-intensity;

a controller, connected with the light-sensor and the laser diode, and used to control the luminous intensity of the laser diode according to the ambient light-intensity detected by the light-sensor.

The embodiments of the present invention have the following beneficial effects:

the lighting effect device and the electric device in accordance with the embodiments of the present invention, utilize one or more light-sources to form a light-layer above an operation surface, so that when an external object touches the surface of a region, the light-layer is blocked, and the reflected light in the direction toward the operation surface will illuminate a part of the operation surface, forming a luminous effect, and the illuminated region has relation with the position of the operation body.

The embodiments of the present invention require fewer light-sources, and do not need position detection, so that they can be implemented with low cost and high reliability.

Meanwhile, by providing a light-uniforming layer and/or a reflective layer, the luminous effect can be improved, thereby providing users a better experience.

DETAILED DESCRIPTION OF THE PREFERRED EMBODIMENTS

The lighting effect device and the electric device in accordance with the embodiments of the present invention, utilize one or more light-sources to form a light-layer above an operation surface of an apparatus, so that when an operation body touches or approaches the operation surface, in other words, when an external object enters into the light-layer, the light-layer is blocked, and the reflected light in the direction toward the operation surface will illuminate a part of the operation surface, forming a luminous effect, and the illuminated region has relation with the position of the operation body.

The lighting effect device in accordance with an embodiment of the present invention is used for an apparatus having an operation surface with the operation surface having a reflective characteristic, and the lighting effect device comprises: at least one light-supplying unit. The at least one light-supplying unit is used for forming a light-layer above the operation surface, and the light-layer has no intersection with the operation surface, and at least part of the light from the light-layer, after being reflected by an operation body which enters into the light-layer, forms a visible optical-effect around the operation body.

The operation surface is a solid surface of any apparatus or any object. For example, a drum surface of a drum, the ground of a floor inside a house, a surface of a housing of an electric device, and the like; further, the operation surface also may be an operable surface provided on an electric device for user, for example, a keyboard surface on an electric device, or a touch-panel surface on an electric device, or a touch-screen surface on an electric device without a keyboard or a touch-panel.

The visible optical-effect formed around an operation body may be an optical-effect formed by means of the light reflected by the operation body being reflected by the operation surface below the operation body; when the operation surface is provided thereon with a light-uniforming plate, the visible optical-effect formed around an operation body is an optical-effect formed by means of the light reflected by the operation body being scattered within the light-uniforming plate. For example, the visible optical-effect formed around an operation body is an optical-effect formed by means of the light reflected by the operation body and the light reflected by the operation surface being scattered within a light-uniforming plate; when the operation surface is provided thereon with a reflective layer and a light-uniforming plate, the visible optical-effect formed around an operation body is an optical-effect formed by means of the light reflected by the operation body and the light reflected by the reflective layer being scattered within the light-uniforming plate.

Certainly, depending on different situations, the visible optical-effect formed around an operation body is also different, which will not be enumerated herein.

Figure 1:
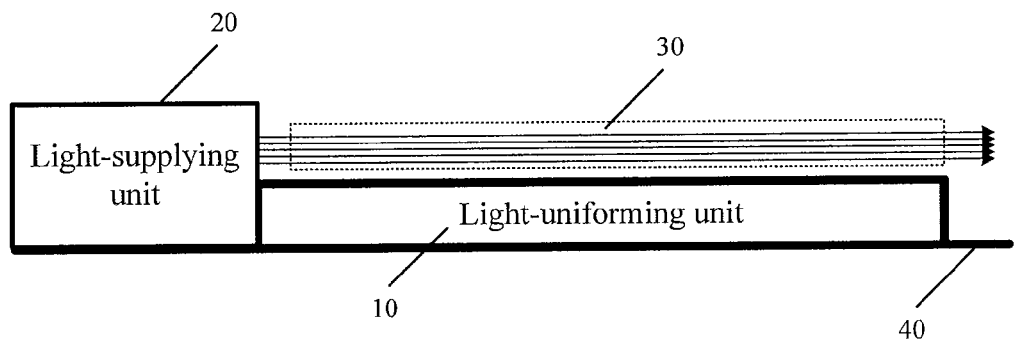
FIG. 1 is a schematic structural view of a lighting effect device in accordance with an embodiment of the present invention.

The lighting effect device in accordance with an embodiment of the present invention is used for an apparatus having an operation surface with the operation surface having a reflective characteristic, that is, the operation surface can reflect light, as shown in FIG. 1, and the lighting effect device comprises:

A light-uniforming unit 10, formed by substances with non-uniform optical properties and provided on an operation surface 40;

At least one light-supplying unit 20, used for forming a light-layer 30 above the light-uniforming unit 10 and covering the light-uniforming unit. Here, "covering" does not indicate that the two components need to contact, it only indicates that the light-layer has a portion overlapping with the light-uniforming unit in a vertical direction.

That is, the at least one light-supplying unit is used for forming a light-layer above the operation surface, the light-layer has no intersection with the operation surface, and at least part of the light from the light-layer enters into the light-uniforming unit after being reflected by an operation body which enters into the light-layer, then the light which enters into the light-uniforming unit forms the visible optical-effect in the scattering effect of the light-uniforming unit; here, the visible optical-effect is a halation, which has a gentle lighting effect and a relative large area.

Certainly, the above-described light-uniforming layer is merely used to ensure a better optical-effect; when there is no light-uniforming layer, at least a part of the light from the light-layer reaches the operation surface after being reflected by an operation body which enters into the light-layer, and thus illuminates the operation surface, forming the visible optical-effect on the operation surface. The visible optical-effect is a luminous effect.

Certainly, when there is no light-uniforming unit, in order to enhance the visibility of the optical-effect, it is also possible that the operation surface is provided thereon with a reflective layer; at least a part of the light from the light-layer reaches the reflector layer after being reflected by an operation body which enters into the light-layer, and forms the visible optical-effect in the reflection effect of the reflective layer; because of the relatively high reflectivity of the reflective layer, the luminance is higher, and the optical-effect is more apparent.

It can be found that, when there is no reflective layer and/or light-uniforming unit on the operation surface, just by means of the light reflected by an operation body which enters into the light-layer being further reflected by the operation surface, the optical-effect is poor; when a reflective layer is added, since the reflective layer has a relatively high reflectivity, compared with the operation surface, more light can enter into human eyes, thus the optical-effect is more evident (the luminance is higher), but in this case, the luminance may be very high in a certain direction and may be relatively poor in another certain direction, so that the optical-effect is not uniform in all directions; if a light-uniforming unit is added, because of the scattering effect of the light-uniforming unit, the optical-effect in this case is more gentle, and because of the scattering, a substantially identical optical-effect can be experienced in each direction, thereby improving experience effect for users.

When there is no object touching the operation surface, the light-layer is located above the light-uniforming unit, and when there is no object entering into the light-transmission path, the light from this layer will not be reflected to human eyes, therefore it is substantially invisible for users, meanwhile the light emitted from the light-supplying unit will not enter into the light-uniforming unit; when an operation body approaches or touches the operation surface, the operation body will block the light-layer, and because the operation body generally has a rough surface, a diffuse reflection will be formed upon the light from the light-layer radiating on the object, so that a portion of the operation body which blocks the light-layer is illuminated, meanwhile, a part of the reflected light will be projected onto the surface of the light-uniforming unit, and refracted into the interior of the light-uniforming unit, and because the light-uniforming unit is formed by substances with non-uniform optical properties, the light which enters into the interior of the light-uniforming unit will be scattered and evenly spreaded, forming a halation (a visible optical-effect) in the interior of the light-uniforming unit.

Meanwhile, if it is ensured that the light-layer covers above the light-uniforming unit uniformly and entirely, whenever the operation body is moved arbitrarily on the operation surface, the operation body can be illuminated and a halation appears under it, that is, the position of the halation corresponds to the position of the operation body relative to the operation surface. Meanwhile, a single object and a plurality of objects all can implement a luminous effect simultaneously.

Certainly, in order to ensure that the light-uniforming unit does not have a luminous effect when there is no object touching the operation surface, the light-uniforming unit is provided with a light-shielding layer at the sides thereof, for blocking light from the sides entering into the light-uniforming unit.

In a specific embodiment of the present invention, the light-uniforming unit may be various sheet material which can achieve a light-scattering function, for example, a light-uniforming plate, an acrylic plate, a light-guiding plate doped with scattering particles (such as nanoparticles); certainly, it also may be a flexible film with a light-scattering function.

Depending on different size and concentration of the scattering particles, the size and luminance of the halation can be varied.

In a specific embodiment of the present invention, the light-uniforming unit also may be provided with a reflective layer at the bottom thereof (between the operation surface and light-uniforming unit), so that the light which enters into the interior of the light-uniforming unit and reaches the bottom is reflected back, and the light reflected back will also be evenly spreaded in the scattering effect of the light-uniforming unit, which enhances the effect of the halation.

In the case that there is a reflective layer, at least part of the light from the light-layer enters into the light-uniforming unit after being reflected by an operation body which enters into the light-layer, the light which enters into the light-uniforming unit forms the visible optical-effect in the scattering effect of the light-uniforming unit and the reflection effect of the reflective layer.

Certainly, when there is no reflective layer, the light which enters into the interior of the light-uniforming unit and reaches the bottom also will be reflected by the operation surface, and the reflected light also will be evenly spreaded in the scattering effect of the light-uniforming unit, but the reflected light is less.

Figure 2A:
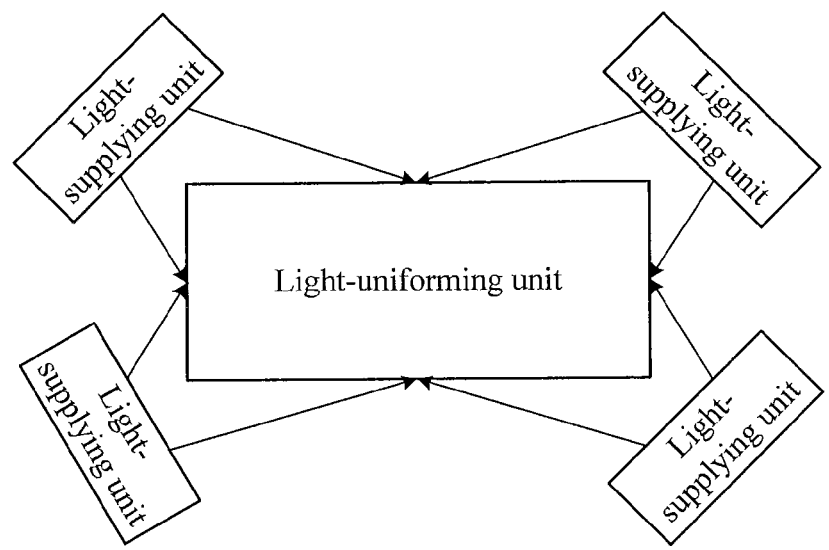
FIGS. 2a, 2b, 2c are schematic views of arrangements of the light-supplying units in three kinds of lighting effect devices which have a plurality of light-supplying units.
Figure 2B:
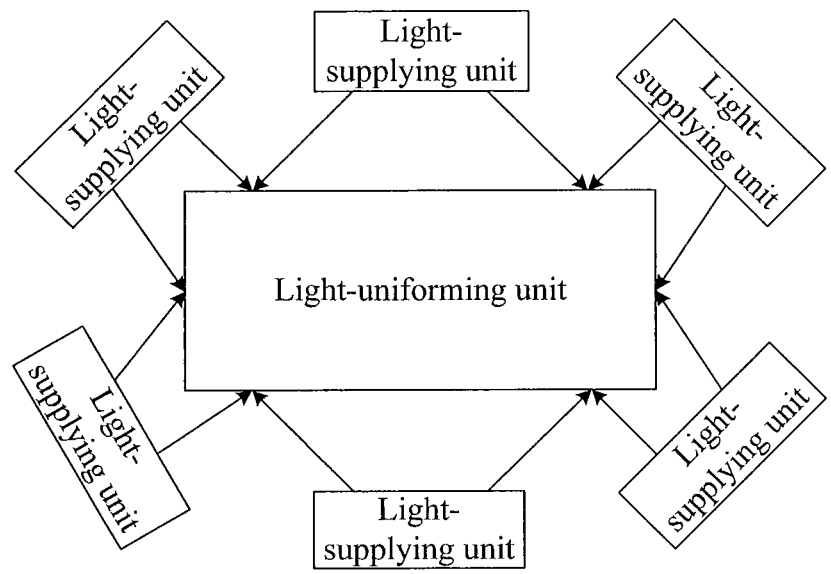
Figure 2C:
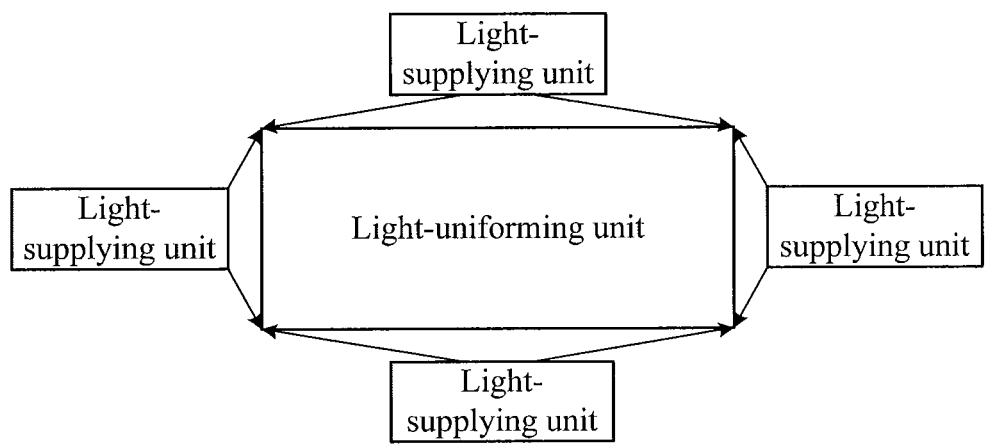

Certainly, taking into consideration of light directivity, in order to ensure the light-layer covering uniformly and entirely so that a better halation effect can be achieved, a plurality of light-supplying units may be provided, as shown in FIGS. 2a, 2b, 2c, etc.; the structures shown in FIGS. 2a, 2b 2c are different only in the numbers and the positions of the light-supplying units, however the internal structure of each light-supplying unit is identical.

In a specific embodiment of the present invention, a light-layer is required to be formed above the light-uniforming unit and covering the light-uniforming unit, and the light-supplying unit may be a parallel light tube.

The parallel light tube is an optical instrument mainly used to generate a parallel light-beam, and by providing one or more parallel light tubes, the parallel light-beams emitted from the parallel light tubes form a light-layer above the light-uniforming unit and covering the light-uniforming unit.

But generally, a parallel light tube is a quite specialized and sophisticated instrument with a high cost; in order to reduce the cost, the light-supplying unit in the embodiments of the present invention also can be implemented in other ways, which will be described as below respectively.

In another implementation of the light-supplying unit, the light-supplying unit comprises:
a light-source;
a baffle, provided in the light-transmission path of the light-source; the baffle is provided thereon with a slit parallel to the operation surface, and the slit is in a higher level than the surface of the operation surface.

Figure 3:
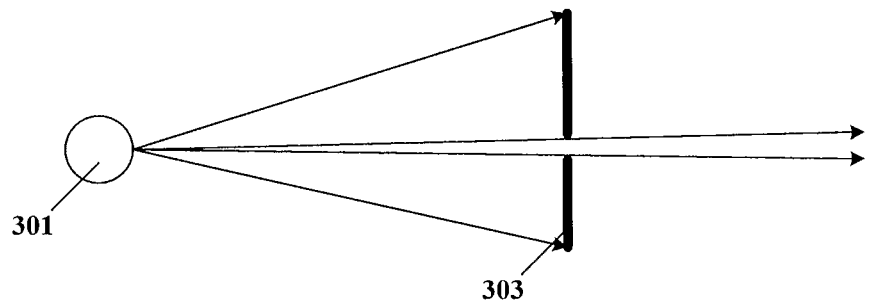
FIG. 3 is a schematic view of a specific structure of a light-supplying unit.

In addition, in another implementation, when the operation surface is provided thereon with a light-uniforming layer, the light-supplying unit is as shown in FIG. 3 and comprises:
a light-source 301;
a baffle 303, provided in the light-transmission path of the light-source; the baffle is provided thereon with a slit parallel to the surface of the light-uniforming unit, and the slit is in a higher level than the surface of the light-uniforming unit.

When the baffle is relatively far distant from the light-source (compared with the height of the slit), the light radiated onto the baffle can be regarded as approximately parallel light, and in this case the light which passes through the slit of the baffle can form a light-layer.

However, in this implementation, because the distance between the baffle and the light-source is necessary to be considered (if the distance is too close, then the light which passes through the slit may be caused to radiate onto the light-uniforming unit, resulting in a deterioration of the halation effect), many factors are to be considered in design; therefore, in another implementation in accordance with the embodiment of the present invention, the light-supplying unit comprises:
a light-source;
an optical module (for example, a convex lens, a prism, etc.), provided in the light-transmission path of light-source, and located between the light-source and the baffle, and used for converting the light emitted from the light-source into parallel light; with a convex lens as an example, the light emitted from the light-source located at the focal point of the convex lens will become parallel light after passing through the convex lens, and the thickness and location of the light-layer can be controlled through the lens itself, and also can be achieved through a baffle provided with a slit.

Figure 4:
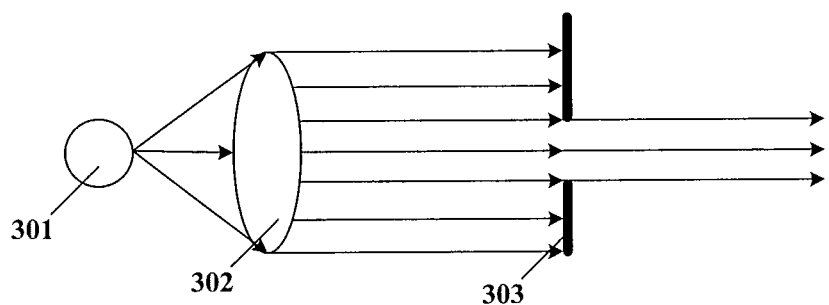
FIG. 4 is a schematic view of another specific structure of a light-supplying unit.

When a baffle with a slit is provided to control the thickness of the light-layer, as shown in FIG. 4, the light-supplying unit 20 comprises:
a light-source 301;
an optical module 302, provided in the light-transmission path of light-source, and used for converting the light emitted from the light-source 301 into parallel light,
a baffle 303, provided in the light-outgoing direction of the optical module 302; the baffle is provided thereon with a slit parallel to the surface of the light-uniforming unit.

As shown in FIG. 4, the thickness of the light-layer can be adjusted by the height of the slit on the baffle 303, and by adjusting the position of the slit, the height of the light-layer distant from the surface of the light-uniforming unit can be adjusted.

Compared with the implementation of directly using a baffle with a slit to provide a light-layer, the implementation of using an optical module in combination with a baffle having a slit to provide a light-layer is more flexible in a lay-out of the device.

In a specific embodiment of the present invention, the light-source 301 may be implemented with a light emitting diode (LED).

But considering that the LED is a diverging light-source, only a small part of the light can pass through the slit on the baffle, so that the effect of the halation will be relatively weak when the ambient light is relatively strong; therefore, in order to improve the effect of the halation, in another embodiment of the present invention, the light-supplying unit comprises:
a laser diode;
a prism, provided in the light-transmission path of the laser diode, and used for scattering the parallel laser beam emitted from the laser diode into flat fan-shaped light, so as to obtain the light-layer.

In a specific implementation, the prism is a column-shaped prism.

Compared with the implementation of using an LED, using a laser diode can have the following advantages:

1. A High Efficiency

Because an LED emits diverging light in an approximately conical-surface shape, while a laser diode emits scattering light in an approximately planar-fan shape, as the distance increases, the light-intensity loss of the light emitted from the LED is much higher than the light-intensity loss of the light emitted from the laser diode; therefore, compared with using an LED as a light-source, using a laser diode as a light-source has a higher efficiency.

2. A Simpler Structure-Design

As shown in FIG. 3, when an LED is used, if a slit structure is directly used to form a light-layer, then the light which passes through the slit is after all still diverging, and when the divergence angle increases to a certain extent, the light will be directly incident into or enter into users' eyes due to diffuse reflection by other barriers; to solve the above problem, a structural optimal design is needed, but the optimal design will inevitably bring design difficulties.

In contrast, the light emitted by a laser diode is parallel light itself, and after passing through a column-shaped prism, the light is scattered in a fan-surface shape along a horizontal direction, and it is in parallel along a vertical direction, almost without a divergence angle; therefore, the above problem does not exist, and the design is simpler.

3. A Good Controllability of the Luminance

In an embodiment of the invention, when a laser diode is used, there also may be provided:

a light-sensor for detecting ambient light-intensity;

a controller, connected with the light-sensor and the laser diode, and used to control the luminous intensity of the laser diode according to the ambient light-intensity detected by the light-sensor.

The controller can control the luminous intensity of the laser diode by controlling the driving voltage/current of the laser diode.

With the above-described setting of the modules, the luminous intensity of the laser diode is controlled to become small when the external environment light is relatively weak, and the luminous intensity of the laser diode is controlled to become large when the external environment light is relatively strong; therefore, a better controllability is provided, as well as a better energy-saving.

Meanwhile, a most comfortable viewing effect can also be provided for users.

The lighting effect device in accordance with the embodiment of the present invention can be used in a variety of situations, which will be described with examples as below.

1. An Application to a Floor

The above-described light-uniforming unit is applied on a surface of a floor, and one or more accommodating space used for light-supplying units are provided around the floor, in which the light-supplying units are placed, and through an appropriate structural adjustment, the light emitted from the light-supplying units can form a light-layer on the surface of the light-uniforming unit.

When a person walks across the floor, the feet will block the light-layer, and the light radiated on the feet illuminates the feet; meanwhile, a part of the light radiated on the feet will be reflected to the light-uniforming unit and enter into the interior of light-uniforming unit; the light which enters into the interior of the light-uniforming unit will be scattered and evenly spreaded, forming a halation in the interior of the light-uniforming unit.

Moreover, as the person continues to advance, the position of the halation will also advance by following the footsteps.

2. An Application in Percussion Instruments

The above-described light-uniforming unit is applied on a surface of a percussion instrument (such as a drum), and one or more accommodating space used for light-supplying units are provided around the percussion instrument, in which the light-supplying units are placed, and through an appropriate structural adjustment, the light emitted from the light-supplying units can form a light-layer on the surface of the light-uniforming unit.

When an object hits the surface of the percussion instrument, the object will block the light-layer, and because the object generally has a rough surface, a diffuse reflection will be formed upon the light from the light-layer radiating on the object, so that the portion of the object which blocks the light-layer is illuminated; meanwhile, a part of the reflected light will be projected onto the surface of the light-uniforming unit, and refracted into the interior of the light-uniforming unit, and because the light-uniforming unit is formed by substances with non-uniform optical properties, the light which enters into the interior of the light-uniforming unit will be scattered and evenly spreaded, forming a halation in the interior of the light-uniforming unit.

Moreover, with different hitting position, the position of the halation will also be changed.

3. An Application in Electric Devices

The electric device in accordance with an embodiment of the present invention comprises:

a housing, having a first hole located in a first surface of the housing;

an operable member having an operation surface (such as a keyboard surface, and/or, a touch-surface of a touch-panel, and/or, a screen-surface of a touch-screen, etc.), located in the housing, with the operation surface being exposed through the first hole;

at least one light-supplying unit, provided in the housing and used for forming a light-layer above the operation surface, wherein, the light-layer has no intersection with the operation surface, and at least part of the light from the light-layer, after being reflected by an operation body which enters into the light-layer, forms a visible optical-effect around the operation body;

the position of the visible optical-effect corresponds to the position of the operation body relative to the operation surface.

The above-described keys of a keyboard, and/or, a touch-surface of a touch-panel, and/or, a screen-surface of a touch-screen, are exposed through the respective corresponding holes and used for users' operation.

For the above-described light-supplying unit, it is only necessary to ensure that a light-layer can be formed above the touch-surface and covering the operation surface.

Figure 5A:
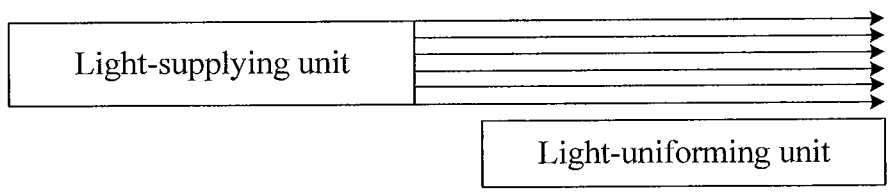
FIGS. 5a, 5b, 5c are schematic diagrams showing relative positional relationships between a light-supplying unit and a light-uniforming unit.
Figure 5B:
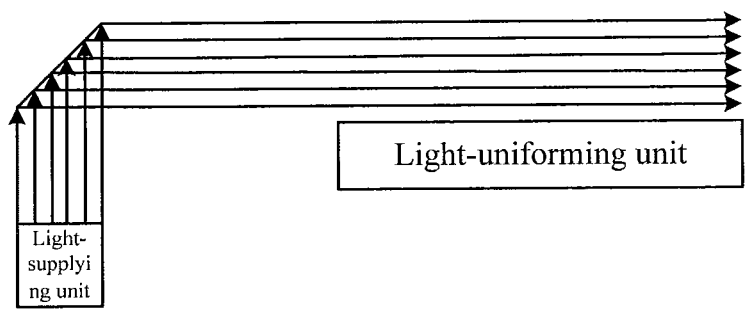
Figure 5C:
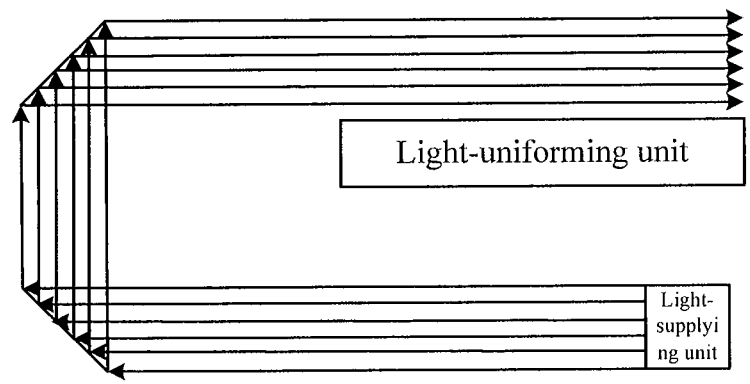

Certainly, as aforementioned, the operation surface can be covered with a reflective layer and/or a light-uniforming layer, and in this case, for the above-described light-supplying unit, it is only necessary to ensure that a light-layer can be formed above the reflective layer and/or the light-uniforming layer and covering the light-uniforming layer; the specific location of the light-supplying unit can be various, as shown in FIGS. 5a-5c, which are schematic diagrams of several possible situations.

As shown in FIG. 5a, the light-supplying unit is in a higher level than the light-uniforming unit in a direction perpendicular to the operation surface, and the light emitted from the light-supplying unit is naturally in a higher level than the light-uniforming unit.

As shown in FIG. 5b, the light-supplying unit is lower than the light-uniforming unit in a direction perpendicular to the operation surface, and by means of a reflector, the light emitted from the light-supplying unit forms a light-layer above the light-uniforming unit and covering the light-uniforming unit.

As shown in FIG. 5c, the light-supplying unit is lower than the light-uniforming unit in a direction perpendicular to the operation surface, and by means of two reflectors, the light emitted from the light-supplying unit forms a light-layer above the light-uniforming unit and covering the light-uniforming unit.

Certainly, the above description is merely an explanation with examples, for indicating that the positional relationship between the light-supplying unit and light-uniforming unit is not determined, which may be implemented in various ways.

The electric device comprises a touch-panel, and the operation surface is a touch-surface of the touch-panel; after the light-uniforming unit is applied to the touch-surface, the upper surface of the light-uniforming unit is lower than the upper surface of the housing;

The light-supplying unit comprises a light-source, and the light-source is provided in the interior of the housing; the interior of the housing has a light-channel, and the light emitted from the light-source can pass through the slit structure and form the light-layer above the light-uniforming unit.

Figure 6:
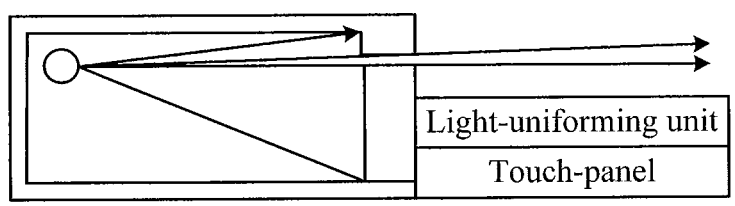
FIG. 6 is a schematic structural view, after a light-supplying unit and a light-uniforming unit are provided to an electric device.

The light-channel may be a slit as shown in FIG. 6, but also may be a transparent glass embedded in the interior of the housing.

Below, with an electric device as an example, two structures of the embodiments of the present invention will be described in detail; and in the following two structures, the description will be given with a notebook computer and a touch-panel as examples; however, it should be understood that, they may also be structures for a mobile phone and a touch-screen.

The First Structure

In the first structure, the electric device comprises:

a housing with a hole;

a touch-panel having a touch-screen, located in the housing, with the touch-screen exposed through the hole and used for users' operation;

a light-emitting element (such as an LED), provided in the housing;

Meanwhile, in the light-emitting direction of the LED, the interior of the housing is formed with a slit parallel to the touch-surface of the touch-panel.

Further, the slit is in a higher level than the touch-surface of the touch-panel.

The housing of the electric device has a slit; a touch-panel provided with a light-uniforming unit is mounted on the housing, and the touch-surface of the touch-panel is parallel to the slit. The slit is in a higher level than the upper surface of the light-uniforming unit.

Figure 7:
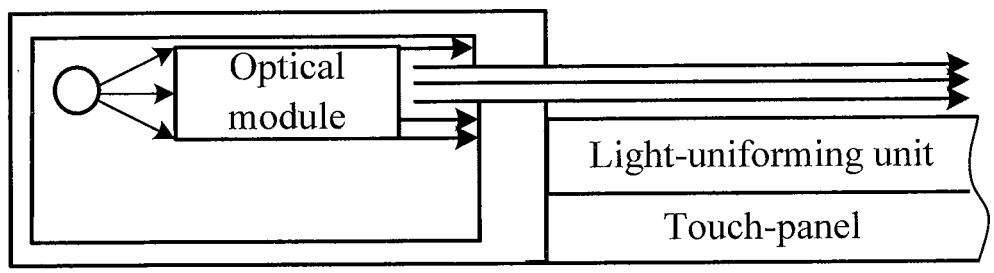
FIG. 7 is a schematic diagram showing a relative relationship among various modules in a notebook computer in accordance with an embodiment of the present invention.

As shown in FIG. 7, the light-emitting element and the optical module are located in the interior of the housing, while the touch-panel applied with a light-uniforming unit is embedded in the housing, and the surface is exposed for users' operations; between the optical module and the touch-panel applied with the light-uniforming unit, there is a baffle, and the baffle is formed thereon with a channel which is light-transmissive and in a higher level than the surface of the light-uniforming unit, and via the channel, the light which passes through the optical module forms a light-layer above the light-uniforming unit.

The baffle can be integrated on the housing, and integrally formed with the housing; certainly, it also may be provided individually.

A part of the light emitted from the LED is blocked by the interior of the housing, and a part of the light which passes through the horizontal slit forms a light-layer above the touch-surface; the light-layer has no intersection with the operation surface, and at least part of the light from the light-layer, after being reflected by an operation body which enters into the light-layer, forms a visible optical-effect around the operation body.

The position of the visible optical-effect corresponds to the position of the operation body relative to the operation surface.

Certainly, in order to ensure that the light-layer is formed by parallel light, an optical module can be provided between the LED and the horizontal slit, for converting the light emitted from the light-source into parallel light.

After the optical module converts the light emitted from the LED into parallel light, a part of the parallel light after conversion passes through the horizontal slit, and forms a light-layer above the touch-surface.

Certainly, as previously shown, by providing reflectors, the positions of the LED and the optical module can be adjusted, which will not be exemplarily enumerated herein.

Certainly, in the figure, only one LED and one optical module are shown, but it should be understood that, a plural number of the combination of the LED and the optical module may be provided, for example 4, one in each direction of the touch-panel, so as to achieve a better covering effect of the light-layer.

With the above setting, referring to FIG. 7, it can be found that, a part of the parallel light which passes through the optical module is blocked by the housing, while the other part of the light passes through the housing and forms a light-layer above the touch-panel; when there is no object contacting the upper surface of the touch-panel, no object enters into the light-transmission path, this light-layer will be transmitted continuously, and will not be reflected to human eyes, therefore it is substantially invisible for users; meanwhile the light emitted from the light-supplying unit will not enter into the light-uniforming unit, thus no optical effect is generated.

Once a user performs a touch operation, or an operation body approaches the operation surface, there will be an operation body entering into the light-transmission path and thus blocking the light-layer; because the operation body generally has a rough surface with a certain reflective performance, a diffuse reflection will be formed upon the light from the light-layer radiating on the operation body, so that a portion of the operation body which blocks the light-layer is illuminated, meanwhile, a part of the light reflected by the operation body will be projected onto the surface of the light-uniforming unit, and refracted into the interior of the light-uniforming unit, and because the light-uniforming unit is formed by substances with non-uniform optical properties, the light which enters into the interior of the light-uniforming unit will be scattered and evenly spreaded, forming a halation (a visible optical-effect) in the interior of the light-uniforming unit.

Meanwhile, it can be seen that, the position of the halation corresponds to the current position of the pointing object and moves along with the movement of the operation body, and the light reflected by the operation body will also be changed and projected to different regions of the surface of the light-uniforming unit; thus a halation is formed in a different position, so that it achieves an effect, that is, as the operation body moves, the light spot moves, and the halation also moves along with the movement of the operation body.

Certainly, when the touch-surface is provided with a reflective layer and a light-uniforming unit, a diffuse reflection will be formed upon the light from the light-layer radiating on the object, so that a portion of the operation body which blocks the light-layer is illuminated, meanwhile, a part of the reflected light will be projected onto the surface of the light-uniforming unit, and refracted into the interior of the light-uniforming unit, and because the light-uniforming unit is formed by substances with non-uniform optical properties, the light which enters into the interior of the light-uniforming unit will be scattered and evenly spreaded; meanwhile, the reflective layer can reflect back the light which enters into the interior of the light-uniforming unit and reaches the bottom, and the light reflected back will also be evenly spreaded in the scattering effect of the light-uniforming unit, which enhances the effect of the halation.

Certainly, it should be understood that, the touch-panel needs to be connected with a motherboard, in order to send touch-signals to a processor for processing; the LED may be powered through the motherboard, and thus the LED can be controlled by the motherboard; certainly, the LED also may be powered individually, and thus controlled individually by hardware such as a button.

The Second Structure

In the second structure, the electric device comprises:

a housing with a first hole;

a touch-panel having a touch-screen, located in the housing, with the touch-screen exposed through the first hole and used for users' operation;

a laser diode, provided in the housing;

a prism, provided in the housing and located in the light-transmission path of the laser diode; after the prism scatters the parallel laser beam emitted from the laser diode into flat fan-shaped light, the light travels out through a second hole on the housing, and forms a light-layer above the touch-surface; the light-layer has no intersection with the operation surface, and at least part of the light from the light-layer, after being reflected by an operation body which enters into the light-layer, forms a visible optical-effect around the operation body.

The position of the visible optical-effect corresponds to the position of the operation body relative to the operation surface.

The electric device may further comprise a light-uniforming unit which is provided on the touch-surface of the touch-panel. In this case, after the prism scatters the parallel laser beam emitted from the laser diode into flat fan-shaped light, the light travels out through the second hole on the housing, and forms a light-layer above the light-uniforming unit; the light-layer has no intersection with the upper surface of the light-uniforming unit, and at least part of the light from the light-layer, after being reflected by an operation body which enters into the light-layer, forms a visible optical-effect around the operation body.

The laser diode may be provided at any position where its light can be reflected by a reflector to one end of the prism; the parallel laser beam emitted from the laser diode, after transmission inside the prism, is scattered into flat fan-shaped light, and the flat fan-shaped light can form a light-layer.

Certainly, as aforementioned, a plural number of the combination of the laser LED and the prism may be provided, for example 4, 6, 8 or even more, so as to achieve a better covering effect of the light-layer.

With the above setting, the light which travels through the prism forms a light-layer above the touch-panel; when there is no object contacting the upper surface of the touch-panel, no object enters into the light-transmission path, this light-layer will be transmitted continuously, and will not be reflected to human eyes, therefore it is substantially invisible for users; meanwhile the light emitted from the light-supplying unit will not enter into the light-uniforming unit, thus no optical effect is generated.

Once a user performs a touch operation, or an operation body approaches the operation surface, there will be an operation body entering into the light-transmission path, and the operation body will block the light-layer; because the operation body generally has a rough surface with a certain reflective performance, a diffuse reflection will be formed upon the light from the light-layer radiating on the operation body, so that a portion of the operation body which blocks the light-layer is illuminated, meanwhile, a part of the light reflected by the operation body will be projected onto the surface of the light-uniforming unit, and refracted into the interior of the light-uniforming unit, and because the light-uniforming unit is formed by substances with non-uniform optical properties, the light which enters into the interior of the light-uniforming unit will be scattered and evenly spreaded, forming a halation (a visible optical-effect) in the interior of the light-uniforming unit.

Certainly, when the touch-surface is provided with a reflective layer and a light-uniforming unit, a diffuse reflection will be formed upon the light from the light-layer radiating on the object, so that a portion of the operation body which blocks the light-layer is illuminated, meanwhile, a part of the reflected light will be projected onto the surface of the light-uniforming unit, and refracted into the interior of the light-uniforming unit, and because the light-uniforming unit is formed by substances with non-uniform optical properties, the light which enters into the interior of the light-uniforming unit will be scattered and evenly spreaded; meanwhile, the reflective layer can reflect back the light which enters into the interior of the light-uniforming unit and reaches the bottom, and the light reflected back will also be evenly spreaded in the scattering effect of the light-uniforming unit, which enhances the effect of the halation.

Meanwhile, it can be seen that, the position of the halation corresponds to the current position of the operation body and moves along with the movement of the operation body, and the light reflected by the operation body will also be changed and projected to different regions of the surface of the light-uniforming unit; thus a halation is formed in a different position, so that it achieves an effect that the halation moves along with the movement of the operation body.

Certainly, it should be understood that, the touch-panel needs to be connected with a motherboard, in order to send touch-signals to a processor for processing; the laser LED may be powered through the motherboard, and thus the laser LED can be controlled by the motherboard; certainly, the laser LED also may be powered individually, and thus controlled individually by hardware such as a button.

Certainly, the electric device in accordance with the embodiment of the invention also may be a mobile phone, a tablet computer, and the like which comprises: a housing, having a first hole located in a first surface of the housing;

a touch-screen having a touch-surface, located in the housing, with the touch-surface exposed through the first hole;

at least one light-supplying unit, provided in the housing and used for forming a light-layer above the operation surface, wherein, the light-layer has no intersection with the operation surface, and at least part of the light from the light-layer, after being reflected by an operation body which enters into the light-layer, forms a visible optical-effect around the operation body;

the position of the visible optical-effect corresponds to the position of the operation body relative to the operation surface.

Certainly, a reflective layer and a light-uniforming layer may be provided above the touch-surface. Working in the same way as the notebook computer described previously, a light spot can also move along when an operation body moves, so that it achieves an effect that the halation moves along with the movement of the operation body.

Certainly, for a touch screen, if a light-uniforming layer is provided, it will have a very significant impact on the display effect, and in a specific embodiment of the present invention, it can be implemented by the following ways:

the electric device in accordance with the embodiment of the invention also may be a mobile phone, a tablet computer, and the like which comprises: a housing, having a first hole located in a first surface of the housing;

a touch-screen having a touch-surface, located in the housing, with the touch-surface exposed through the first hole;

at least one light-supplying unit, provided in the housing and used for forming a light-layer above the operation surface, wherein, the light-layer has no intersection with the operation surface, and at least part of the light from the light-layer, after being reflected by an operation body which enters into the light-layer, forms a visible optical-effect around the operation body;

the position of the visible optical-effect corresponds to the position of the operation body relative to the operation surface;

in the touch screen, there comprises at least a controllable layer and a control unit used to control the controllable layer; the control unit is used to acquire the coordinates of an operation body, based on the detection result of the touch-screen, and then based on the coordinates, to control a specific region of the controllable layer which contains the coordinates to change from a transparent state into a light-uniforming state; in the light-uniforming state, the light which enters into the interior of the controllable layer will be scattered and evenly spreaded.

The control unit is also used to control the controllable layer to restore the transparent state after the operation body leaves from the touch-surface.

Below, an explanation of the above-described implementation will be given.

In a normal situation, the controllable layer of the touch-screen is in a transparent state, and the electric device is in a normal operation; once a user performs a touch operation, an operation body will contact the touch-surface of the touch-screen, and at this point the operation body enters into the light-transmission path, and the operation body will block the light-layer; because the operation body generally has a rough surface with a certain reflective performance, a diffuse reflection will be formed upon the light from the light-layer radiating on the operation body, so that a portion of the operation body which blocks the light-layer is illuminated, meanwhile, a part of the light reflected by the operation body will be projected to the touch-surface, forming a facula.

Meanwhile, after the touch screen detects the touch-coordinates of the operation body, based on the coordinates, the control unit controls a specific corresponding region of the controllable layer which contains the coordinates to change from the transparent state into the light-uniforming state; and after a part of the light reflected by the operation body is projected to the touch-surface, it is certain that a part of the light enters into the specific region of the controllable layer which contains the coordinates; at this point, the light which enters into the interior of the specific region of the controllable layer will be scattered and evenly spreaded, achieving an effect of light-uniforming.

Meanwhile, once the operation body is detected leaving from the touch-surface, the control unit controls the specific region of the controllable layer to restore the transparent state.

For the above-described operation of the control unit, it is possible that the entire controllable layer is controlled for a state-change, and it is also possible that the controllable layer is controlled for a state-change in a portion thereof within a preset range of the touch point; certainly, the latter implementation is more reasonable, which will not affect users watching the non-touched portion.

The above description is merely the preferred implementations of the present invention. It should be noted that, for the ordinary skilled in the art, improvements and modifications can be made without departing from the principles of the present invention, also these improvements and modifications should be regarded as within the protection scope of the present invention.

What is claimed is:

1. A lighting effect device, used for an apparatus having an operation surface with the operation surface having a reflective characteristic, characterized in that, the lighting effect device comprises:
   at least one light-supplying unit for forming a light-layer above the operation surface, wherein, the light-layer has no intersection with the operation surface, and at least part of the light from the light-layer, after being reflected by an operation body which enters into the light-layer, forms a visible optical-effect around the operation body.

2. The lighting effect device according to claim 1, characterized in that, the lighting effect device further comprises:
   a light-uniforming unit, formed by substances with non-uniform optical properties and provided on the operation surface;
   at least part of the light from the light-layer enters into the light-uniforming unit after being reflected by an operation body which enters into the light-layer, then the light which enters into the light-uniforming unit forms the visible optical-effect in the scattering effect of the light-uniforming unit.

3. The lighting effect device according to claim 2, characterized in that, the light-uniforming unit is a light-uniforming plate, an acrylic plate, a light-guiding plate doped with scattering particles, or a flexible film with a light-scattering function.

4. The lighting effect device according to claim 1, characterized in that, the light-supplying unit is a parallel light tube.

5. The lighting effect device according to claim 2, characterized in that, the light-supplying unit comprises:
   a light-source;
   a baffle, provided in the light-transmission path of the light-source, wherein, the baffle is provided thereon with a slit parallel to the surface of the light-uniforming unit, the slit is in a higher level than the surface of the light-uniforming unit, and the light passing through the slit forms the light-layer.

6. The lighting effect device according to claim 5, characterized in that, the light-supplying unit further comprises:
   an optical module, provided between the light-source and the baffle, and used for converting the light emitted from the light-source into parallel light.

7. The lighting effect device according to claim 1, characterized in that, the lighting effect device further comprises:
   a light-uniforming unit, formed by substances with non-uniform optical properties and provided on the operation surface;
   a reflective layer, provided between the light-uniforming unit and the operation surface;
   at least part of the light from the light-layer enters into the light-uniforming unit after being reflected by an operation body which enters into the light-layer, the light which enters into the light-uniforming unit forms the visible optical-effect in the scattering effect of the light-uniforming unit and the reflection effect of the reflective layer.

8. The lighting effect device according to claim 1, characterized in that, the lighting effect device further comprises:
   a reflective layer, provided on the operation surface;
   at least part of the light from the light-layer reaches the reflective layer after being reflected by an operation body which enters into the light-layer, and forms the visible optical-effect in the reflection effect of the reflective layer.

9. The lighting effect device according to claim 1, characterized in that, the light-supplying unit comprises:
a laser diode;
a column-shaped prism, provided in the light-transmission path of the laser diode.

10. The lighting effect device according to claim 9, characterized in that, it further comprises:
a light-sensor for detecting ambient light-intensity;
a controller, connected with the light-sensor and the laser diode, and used to control the luminous intensity of the laser diode according to the ambient light-intensity detected by the light-sensor.

11. An electric device, characterized in that, it comprises:
a housing, having a first hole located in a first surface of the housing;
an operable member having an operation surface, located in the housing, with the operation surface being exposed through the first hole;
at least one light-supplying unit, provided in the housing and used for forming a light-layer above the operation surface, wherein, the light-layer has no intersection with the operation surface, and at least part of the light from the light-layer, after being reflected by an operation body which enters into the light-layer, forms a visible optical-effect around the operation body;
the position of the visible optical-effect corresponds to the position of the operation body relative to the operation surface.

12. The electric device according to claim 11, characterized in that, it further comprises:
a light-uniforming unit, formed by substances with non-uniform optical properties and applied on the operation surface;
at least part of the light from the light-layer enters into the light-uniforming unit after being reflected by an operation body which enters into the light-layer, and the light which enters into the light-uniforming unit forms the visible optical-effect in the scattering effect of the light-uniforming unit.

13. The electric device according to claim 12, characterized in that, the light-uniforming unit is a light-uniforming plate, an acrylic plate, a light-guiding plate doped with scattering particles, or a flexible film with a light-scattering function.

14. The electric device according to claim 12, characterized in that, the electric device further comprises a touch-panel, and the operation surface is a touch-surface of the touch-panel; the touch-panel is embedded on the housing, and after the light-uniforming unit is applied to the touch-surface, the upper surface of the light-uniforming unit is lower than the upper surface of the housing;
the light-supplying unit comprises a light-source, and the light-source is provided in the interior of the housing; the interior of the housing has a light-channel, and the light emitted from the light-source passes through the light-channel and forms the light-layer above the light-uniforming unit.

15. The electric device according to claim 14, characterized in that, the light-source is a laser diode, and the light-supplying unit further comprises a column-shaped prism provided in the light-channel.

16. The electric device according to claim 15, characterized in that, it further comprises:
a light-sensor for detecting ambient light-intensity;
a controller, connected with the light-sensor and the laser diode, and used to control the luminous intensity of the laser diode according to the ambient light-intensity detected by the light-sensor.

17. The electric device according to claim 11, characterized in that, it further comprises:
a light-uniforming unit, formed by substances with non-uniform optical properties and applied on the operation surface;
a reflective layer, provided between the light-uniforming unit and the operation surface;
at least part of the light from the light-layer enters into the light-uniforming unit after being reflected by an operation body which enters into the light-layer, the light which enters into the light-uniforming unit forms the visible optical-effect in the scattering effect of the light-uniforming unit and the reflection effect of the reflective layer.

18. The electric device according to claim 11, characterized in that, it further comprises:
a reflective layer, provided on the operation surface;
at least part of the light from the light-layer reaches the reflective layer after being reflected by an operation body which enters into the light-layer, and forms the visible optical-effect in the reflection effect of the reflective layer.

19. The electric device according to claim 11, characterized in that, the light-supplying unit is a parallel light tube.

* * * * *